Nov. 13, 1923.

H. R. RICARDO

INTERNAL COMBUSTION ENGINE

Filed Dec. 31, 1919

1,474,003

Patented Nov. 13, 1923.

1,474,003

UNITED STATES PATENT OFFICE.

HARRY RALPH RICARDO, OF LONDON, ENGLAND, ASSIGNOR TO WAUKESHA MOTOR COMPANY, OF WAUKESHA, WISCONSIN, A CORPORATION OF WISCONSIN.

INTERNAL-COMBUSTION ENGINE.

Application filed December 31, 1919. Serial No. 348,614.

*To all whom it may concern:*

Be it known that I, HARRY RALPH RICARDO, subject of the King of England, and residing at London, in England, have invented certain new and useful Improvements in Internal-Combustion Engines, of which the following is a specification.

This invention relates to internal combustion engines in which both the inlet and exhaust valves are disposed in one and the same side pocket and has for its object to effect certain improvements in the construction of the combustion chamber.

In internal combustion engines of the four-cycle type which operate on the constant volume cycle and have the valves placed in side pockets, it is difficult to provide valves of sufficient size adequately to supply the cylinder, and at the same time avoid the use of a very shallow combustion chamber. To some extent the difficulty can be overcome by the employment of a very long stroke in relation to the cylinder bore, but it is not generally convenient to do so. The objections to the use of a shallow combustion chamber are: First, that the ratio of surface to volume is unduly large. Secondly, that the turbulence created by the entry of the gas at a high velocity through the inlet valve which is absolutely essential in order to produce a rapid spread of the flame and at the same time to prevent the isolation and subsequent detonation of a portion of the charge, is very quickly damped out owing to skin friction. Thirdly, that it seems evident that in all cylinders there is always a layer of gas in contact with the walls of the combustion chamber which is stagnant and so chilled that it does not burn completely, and the thickness of this layer is dependent upon the degree of turbulence within the combustion chamber.

That these objections are very serious is illustrated by the fact that many experimenters have found with engines having the valves fitted in side pockets that increase of the compression beyond a certain and fairly low figure merely results in a greatly increased tendency to detonation without effecting any appreciable improvement in either the power output or economy. On the other hand with engines having valves in the head and a symmetrical combustion chamber both the power output and economy are directly proportional to the air cycle efficiency corresponding to the compression ratio within the limits which can be employed. Also experiments prove that, other things being equal, the power output of an engine with a symmetrical combustion chamber is from 10% to 20% greater than that of one with valves in side pockets as heretofore arranged.

According to this invention the cylinder is formed with a flat head which is arranged so as to permit between the cylinder head and the piston only the minimum clearance which is necessary for mechanical reasons. A valve pocket or space is situated at one side of the cylinder bore and is formed so as to constitute the combustion space or the major portion thereof and a port or passage which has substantially the same area as the inlet valve port serves as a communication between this combustion space and the end or bore of the cylinder. That portion of the side pocket which carries the valves is formed integral with the cylinder and the head of the cylinder is preferably detachable. In one construction the detachable head is formed flat with a recess in it the main part of which is adapted to lie over the valves and constitute the greater part of the combustion space while the remaining portion of the recess extends into the end of the cylinder and constitutes a passage leading thereinto from the combustion chamber. The cross sectional area of this communicating passage is substantially the same as that of the inlet valve port and the end of this passage or a part of the recess may be said to overlap the bore of the cylinder. By employing this construction not only is the area of the combustion chamber greatly reduced for a given volume but at the same time violent turbulence is set up in the combustion chamber throughout the compression stroke and immediately before ignition occurs as the result of the passage of the gases from the cylinder through the somewhat restricted port communicating with the combustion chamber. The isolation of any unburnt portion of the working fluid and its subsequent rapid compression and detonation by the burning portion may be further prevented by placing the ignition device such as a sparking plug, almost centrally in the combustion chamber but this particular disposition of the sparking plug is not necessary.

The accompanying drawings illustrate one method of carrying the invention into practice. In these drawings.

Like letters indicate like parts throughout the drawings.

Figure 1:
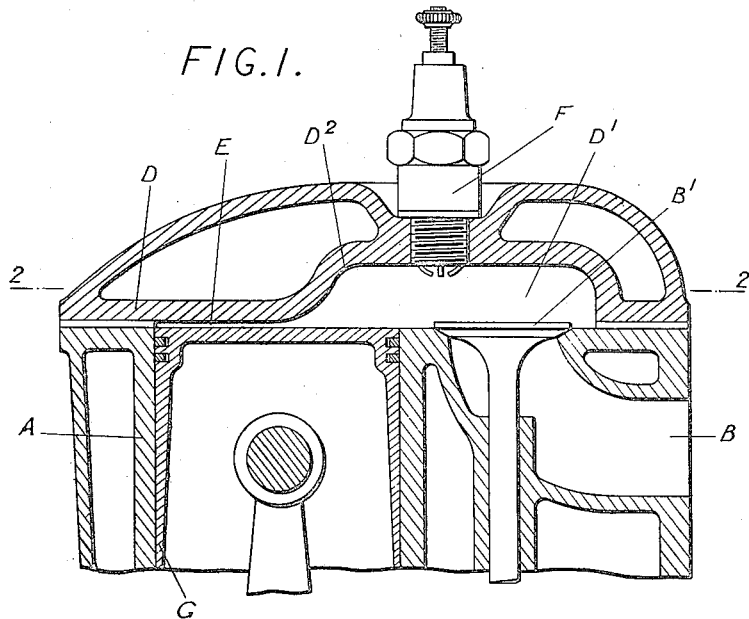
Figure 1 is a sectional elevation of a part of the cylinder of an internal combustion engine constructed in accordance with this invention.
Figure 2:
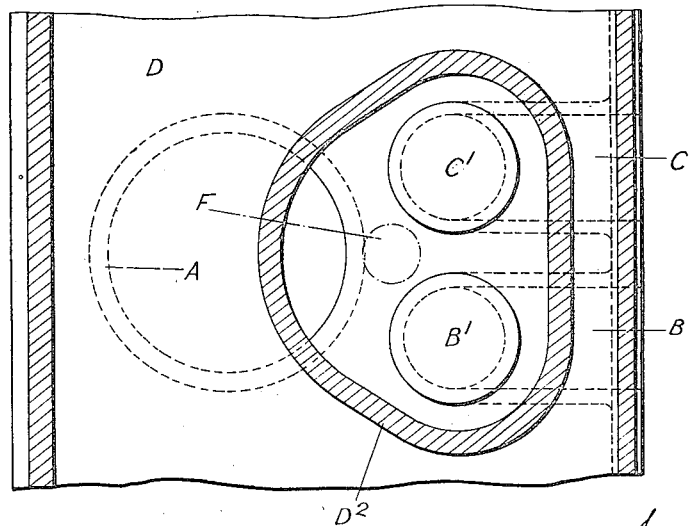
Figure 2 is a sectional plan on the line 2—2 of Figure 1.

A cylinder A has formed integral with it at one side thereof the inlet and exhaust passages B and C constituting a side pocket in which are the valves B' and C'. The head D of the cylinder is formed detachable and is machined flat so that at the end of the cylinder A there is provided as at E the least working clearance that is mechanically necessary. In the flat face of the detachable head D is formed a recess D' which is shaped as shown in Figure 2 so that its wall D² may be said to roughly enclose a triangular space with rounded angles. The greater part of this recess D' lies over the valves B' and C' but a portion of the recess extends into or overlaps the end of the cylinder A. The overlapping portion constitutes a port or passage whose area is approximately equal to that of the inlet port controlled by the valve B'. A sparking plug F is mounted preferably about the centre of the recess D'. The detachable head D is provided with a water jacket of suitable construction and this head may be connected to the cylinder in some convenient manner.

Though the construction embodied in this invention involves the formation of a thin layer of more or less stagnant gas which is entrapped in the clearance space E between the cylinder head D and the piston G, since this small clearance is made the minimum which must be provided on purely mechanical grounds, this layer of gas is so chilled that it does not burn completely and is therefore partially lost from a thermodynamic standpoint, but on the other hand for the same reason it cannot detonate. The thermo-dynamic loss in question is negligible in practice as the volume of gas in the clearance space E is relatively small as compared with that in the remainder of the combustion space. It has been found that a cylinder having a combustion chamber thus formed gives greater power and economy and permits with advantage of a much higher compression ratio without a tendency to detonation.

Though more particularly described as being applicable to internal combustion engines having cylinders with detachable heads it is to be understood that the invention may be employed with other types of such engines in which the valves are fitted in side pockets. The details of construction may be modified as found desirable.

What I claim as my invention and desire to secure by Letters Patent is:—

1. In an internal combustion engine, a cylinder, a piston reciprocating in said cylinder, a combustion chamber adjoining and communicating restrictedly with the end of said cylinder, the end of said cylinder being otherwise permanently closed, said combustion chamber representing all of the effective combustion space when the piston is in the position of greatest compression, and the cross-sectional area of the communication between said combustion chamber and said cylinder being less than that of the cylinder bore, combustible gas inlet and burned gas outlet passages for said combustion chamber, said combustion chamber being otherwise closed, valves for said passages, and spark ignition means for said combustion chamber.

2. In an internal combustion engine, a cylinder, a piston reciprocating in said cylinder, a combustion chamber adjoining and communicating restrictedly with the end of said cylinder, the end of said cylinder being otherwise permanently closed, said combustion chamber representing all of the effective combustion space when the piston is in the position of greatest compression, combustible gas inlet and burned gas outlet passages for said combustion chamber, said combustion chamber being otherwise closed, valves for said passages, and spark ignition means for said combustion chamber, the cross-sectional area of the communication between said combustion chamber and said cylinder being less than that of the cylinder bore but being no less than that of the inlet passage when the valve for said inlet passage is wide open.

3. In an L-head internal combustion engine, a cylinder, a piston reciprocating in said cylinder, a combustion chamber adjoining and communicating restrictedly with the end of said cylinder, the end of said cylinder being otherwise permanently closed, said combustion chamber representing all of the effective combustion space when the piston is in the position of greatest compression, combustible gas inlet and burned gas outlet passages for said combustion chamber, said combustion chamber being otherwise closed, said combustion chamber lying over said passages and over a portion only of said cylinder, valves for said passages, and spark ignition means for said combustion chamber.

4. In an L-head internal combustion engine, a cylinder block having a cylinder bore therein, a piston reciprocating in said cylinder, combustible gas inlet and burned gas outlet passages formed in said block and terminating adjacent the end of said bore, a head lying over said bore and said inlet and outlet passages, said head having a recess formed therein and lying over said inlet and outlet passages and over a portion only of said bore, whereby said recess communicates restrictedly with the end of said cylinder, the end of said cylinder being otherwise permanently closed, said recess being otherwise closed, said recess representing all of the effective combustion space when the piston is in the position of greatest compression, valves for said inlet and outlet passages, and spark ignition means for said combustion chamber.

5. In an internal combustion engine, a cylinder, a piston reciprocating in said cylinder, a combustion chamber adjoining and communicating restrictedly with the end of said cylinder, the end of said cylinder being otherwise permanently closed, said combustion chamber representing all of the effective combustion space when the piston is in the position of greatest compression, and the cross-sectional area of the communication between said combustion chamber and said cylinder being less than that of the cylinder bore, combustible gas inlet and burned gas outlet passages for said combustion chamber, said combustion chamber being otherwise closed, valves for said passages, and spark ignition means placed in said combustion chamber in a substantially central position.

In testimony whereof I have signed my name to this specification.

HARRY RALPH RICARDO.